UNITED STATES PATENT OFFICE.

WILLIAM KING, OF PERTH AMBOY, NEW JERSEY, ASSIGNOR TO WILLIAM KING & CO., OF NEW YORK, N. Y.

IMPROVEMENT IN CORKS.

Specification forming part of Letters Patent No. 166,467, dated August 10, 1875; application filed May 10, 1875.

*To all whom it may concern:*

Be it known that I, WILLIAM KING, of Perth Amboy, in the State of New Jersey, have made certain new and useful Improvements in Corks; and I do hereby declare the following to be a sufficiently full and clear description of the same to enable others skilled in the art to make and use the same.

In the present mode of manufacturing corks the size of the cork is limited to the thickness of the bark or cork-wood, thus making it necessary to use the thin layers of bark in the manufacture of small corks, which are of little value, and often made at a loss by the manufacturer.

The object of my invention is to utilize the thin layers of cork-wood and smaller pieces of bark in the manufacture of the largest-sized corks, so that corks of the most desirable and valuable size may be made from the cork-wood which is now rejected for this purpose, and considered unavailable, except for the production of small-sized corks, which are of little comparative value.

In order to accomplish this object I first prepare the cork-wood, if in large thin pieces of bark, by making the sides thereof of a regular and even surface, and then I spread a cement of the most durable kind that can be procured between two or more layers of cork-wood, and place them under heavy pressure a sufficient length of time to firmly unite the several layers together in one solid slab or sheet. The number of layers required will depend upon the thickness of the cork-wood used and the size of cork it is proposed to make.

If the cork-wood is in small blocks or pieces, of irregular shape and size, such as the smaller corks are usually cut from, these pieces should first have their sides made smooth and even, and are then joined by cement and pressure one to the other until a block is obtained large enough to have cut from it a cork of the largest size. After the cork-wood has been prepared in this way, I cut the corks from it either by hand or machinery in the usual manner, the joints in the cork being hardly perceptible, and, if properly cemented and pressed, they will be as firm as the natural or unbroken fiber of the wood.

As a cement for the purpose of joining the layers of cork-wood, I have used a solution of shellac in alcohol, which I have found to answer the purpose very well, but any good cementing substance will answer the purpose, and I do not limit myself to the use of any particular kind of cement, as the nature and object of my invention consists in the saving of cork-wood by making large-sized corks from thin layers of bark.

When the stopper is cut so that a joint or seam runs longitudinally through it, the pores of the cork will not extend continuously from one side to the other, as they do when it is cut from a single piece, and the cork is thereby materially strengthened.

It will also be observed that the stopper may be cut so that the pores or cells of the cork run lengthwise of it, and yet such pores will not extend continuously from the top to the bottom, but their connection is broken at all points where the cork has been joined.

I am aware that porous stoppers have been rendered air-tight by transversely cutting the finished stopper, and interposing a layer of gutta-percha or other similar substance, or by applying the layer of gutta-percha to the top or bottom end of the stopper, which will also form a protruding rim, and I do not desire to claim any such device; but What I do claim as my invention is—

As a new article of manufacture, a stopper cut from a slab or piece of cork composed of two or more layers, first joined together by cement and pressure, substantially as described.

WILLIAM KING.

Witnesses:
I. E. CANRED,
L. H. SAXE.